United States Patent Office 3,096,355
Patented July 2, 1963

3,096,355
17 - ALKYNYLANDROSTA-4,6-DIENE - 3,17 - DIOLS, ESTERS THEREOF AND 19-NOR COMPOUNDS CORRESPONDING
John S. Baran, Morton Grove, Ill., assignor to G. D. Searle & Co., Chicago, Ill., a corporation of Delaware
No Drawing. Filed Aug. 31, 1961, Ser. No. 135,126
10 Claims. (Cl. 260—397.5)

The present invention is concerned with novel bisoxygenated steroids and, more particularly, with optionally esterified 17α-alkynyl-4,6-diene-3β,17β-diols of the androstane and estrane series, which are represented by the structural formula

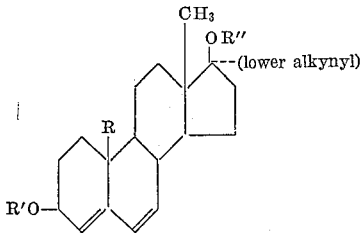

wherein R is hydrogen or a methyl radical, and R' and R" can be hydrogen or a lower alkanoyl group.

The lower alkanoyl groups encompassed by R' and R" are exemplified by formyl, acetyl, propionyl, butyryl, valeryl, caproyl, and the branched-chain isomers thereof.

The compounds of this invention can be conveniently manufactured by utilizing as starting materials the corresponding 3-keto-Δ⁴ compounds of the structural formula

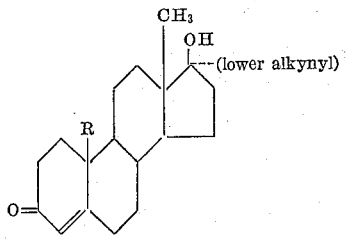

wherein R is hydrogen or a methyl radical. Dehydrogenation of these Δ⁴ compounds, suitably by treatment with chloranil, affords the corresponding Δ⁴,⁶ substances, as is exemplified by the reaction of 17α-ethynyl-17β-hydroxyandrost-4-en-3-one in xylene-tertiary-butyl alcohol with chloranil to produce 17α-ethynyl-17β-hydroxyandrosta-4,6-dien-3-one. Upon heating these Δ⁴,⁶ 3-ketones with a lower alkanoic acid anhydride in pyridine, the corresponding 17β-alkanoates are obtained. For example, the aforementioned 17α - ethynyl-17β-hydroxyandrosta-4,6-dien-3-one is converted to 17β-acetoxy-17α-ethynylandrosta-4,6-dien-3-one by reaction with acetic anhydride in pyridine. These 3-keto-Δ⁴,⁶ intermediates may be converted to the instant 3β-hydroxy derivatives by means of any one of a variety of reducing agents, for example sodium borohydride, lithium aluminum hydride, and lithium tri-(tertiary-butoxy) aluminum hydride. In the case of the 17β-alkanoates, the latter reagent is preferred in order to prevent hydrolysis of the ester group. This process is specifically illustrated by the reaction of 17α-ethynyl-17β-hydroxyandrosta-4,6-dien-3-one or 17β-acetoxy-17α-ethynylandrosta-4,6-dien-3-one in tetrahydrofuran with lithium tri-(tertiary-butoxy) aluminum hydride to yield 17α-ethynylandrosta-4,6-diene-3β,17β-diol and 17β - acetoxy-17α-ethynylandrosta-4,6-dien-3β-ol, respectively.

The instant 3β-(lower alkanoyl)oxy compounds can be produced by reaction of the corresponding 3β-alcohols with a lower alkanoic acid anhydride in pyridine. Typically, 17α-ethynylandrosta-4,6-diene-3β,17β-diol or 17β-acetoxy-17α-ethynylestra-4,6-dien-3β-ol are allowed to react with acetic anhydride in pyridine at room temperature to yield 3β-acetoxy-17α-ethynylandrosta-4,6-dien-17β-ol and 17α-ethynylestra-4,6-diene-3β,17β-diol 3,17-diacetate, respectively.

The compounds of this invention are useful as a result of their valuable pharmacological properties. They are, for example, progestational agents which lack the potent anabolic and androgenic side effects typical of related prior art compositions.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

A mixture of 3 parts of 17α-ethynyl-17β-hydroxyandrost-4-en-3-one, 6 parts of chloranil, 40 parts of tertiary-butyl alcohol, and 100 parts xylene is heated at reflux with stirring for about 5 hours. The resulting solution is cooled to room temperature and washed with about 200 parts of 10% aqueous sodium hydroxide containing 10 parts of sodium sulfite. The organic layer is separated, washed with saturated aqueous sodium chloride, dried quickly over anhydrous sodium sulfate, then evaporated to dryness. The resulting residue is triturated with methanol to afford 17α-ethynyl-17β-hydroxyandrosta-4,6-dien-3-one, melting at about 255–260°; $[\alpha]_D = -99°$ (dioxane). This compound exhibits infrared maxima at about 2.93, 3.06, 3.38, 6.05, 6.18, 6.32, and 9.42 microns and also an ultraviolet absorption maximum at about 283 millimicrons with a molecular extinction coefficient of about 26,000. This compound is represented by the structural formula

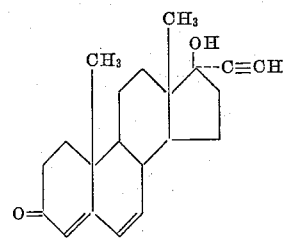

Example 2

The substitution of 3.13 parts of 17β-hydroxy-17α-propynylandrost-4-en-3-one in the process of Example 1 results in 17β-hydroxy-17α-propynylandrosta-4,6-dien-3-one. This compound is represented by the structural formula

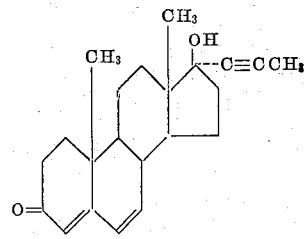

Example 3

A mixture of 2 parts of 17α-ethynyl-17β-hydroxyandrosta-4,6-dien-3-one, 20 parts of acetic anhydride, and 50 parts of pyridine is heated at reflux for about 2 hours, then is cooled to about 0° and diluted with water. The resulting aqueous mixture is extracted with ether, and the organic layer is separated, then washed successively with dilute hydrochloric acid, water, and aqueous sodium bicarbonate. The washed solution is dried over anhydrous sodium sulfate, then evaporated to dryness. Crystallization of the resulting residue from ether-hexane affords 17β - acetoxy - 17α - ethynylandrosta-4,6-dien-3-one, M.P. about 145–146°; [α]$_D$=—86° (chloroform). It is further characterized by infrared maxima at about 3.06, 3.38, 5.71, 6.00, 6.15, 6.30, 8.12 and 9.79 microns and also an ultraviolet maximum at about 282.5 millimicrons with a molecular extinction coefficient of about 26,300. This compound is represented by the structural formula

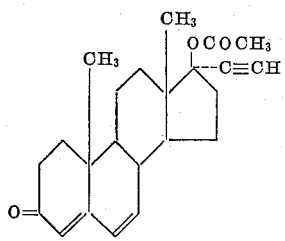

*Example 4*

By substituting 26 parts of propionic anhydride in the process of Example 3, 17α-ethynyl-17β-propionoxyandrosta-4,6-dien-3-one is obtained. This compound is represented by the structural formula

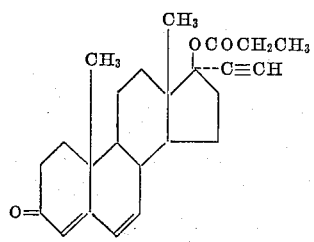

*Example 5*

By substituting 2.06 parts of 17β-hydroxy-17α-propynylandrosta-4,6-dien-3-one and otherwise proceeding according to the processes of Example 3, 17β-acetoxy-17α-propynylandrosta-4,6-dien-3-one is obtained. This compound is represented by the structural formula

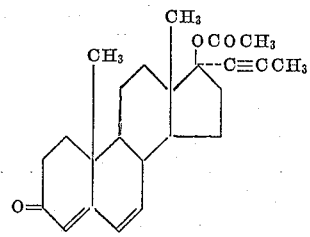

*Example 6*

To a solution of one part of 17α-ethynyl-17β-hydroxyandrosta-4,6-dien-3-one in 50 parts of tetrahydrofuran is added 2 parts of lithium tri-(tertiary-butoxy) aluminum hydride, and the resulting mixture is stirred at room temperature for about one hour, then is acidified with dilute aqueous acetic acid. This acidified aqueous mixture is extracted with chloroform, and the chloroform layer is separated, washed successively with water and aqueous sodium bicarbonate, dried over anhydrous sodium sulfate, and evaporated to dryness. The resulting residue is crystallized from ether-methanol to yield pure 17α-ethynylandrosta-4,6-diene-3β,17β-diol, which melts at about 228–230°. It displays maxima in the ultraviolet at about 232, 238, and 246 millimicrons with molecular extinction coefficients of about 21,000, 24,700, and 14,500, respectively. This compound is represented by the structural formula

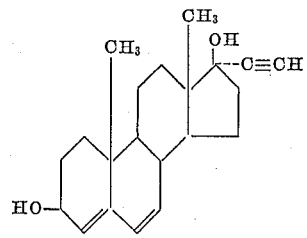

*Example 7*

The substitution of 1.04 parts of 17β-hydroxy-17α-propynylandrosta-4,6-dien-3-one in the procedure of Example 6 results in 17α-propynylandrosta-4,6-diene-3β,17β-diol. This compound is represented by the structural formula

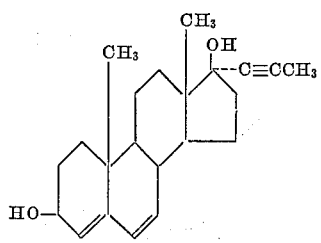

*Example 8*

The substitution of 1.13 parts of 17β-acetoxy-17α-ethynylandrosta-4,6-dien-3-one in the procedure of Example 6 results in an oil, which is crystallized from ether-pentane to yield 17β-acetoxy-17α-ethynylandrosta-4,6-dien-3β-ol. This substance melts at about 138–140°; [α]$_D$=—143° (chloroform). It is further characterized by infrared maxima at about 2.80, 2.92, 3.05, 3.34, 5.78, 6.12, 8.03, 9.66, 9.80, and 11.66 microns, and also ultraviolet maxima at about 231, 238.5, and 246.5 millimicrons with molecular extinction coefficients of about 22,400, 25,400, and 16,500, respectively. This compound is represented by the structural formula

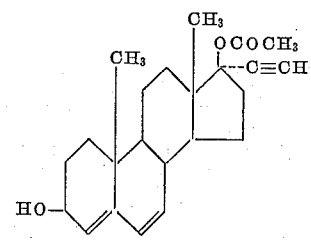

*Example 9*

By substituting 1.19 parts of 17α-ethynyl-17β-propionoxyandrosta-4,6-dien-3-one in the procedure of Example 6, 17α-ethynyl-17β-propionoxyandrosta-4,6-dien-3β-ol is obtained. This compound is represented by the structural formula

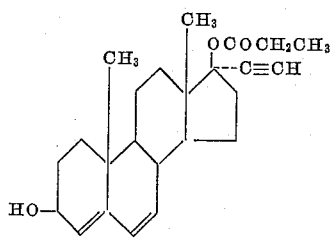

*Example 10*

The substitution of 1.19 parts of 17β-acetoxy-17α-propynylandrosta-4,6-dien-3-one in the procedure of Example 6 results in 17β-acetoxy-17α-propynylandrosta-4,6- dien-3β-ol. This compound is represented by the structural formula

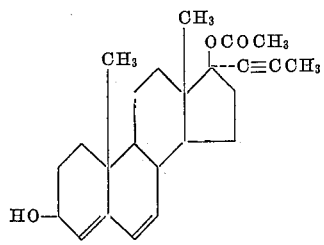

*Example 11*

A mixture of one part of 17α-ethynylandrosta-4,6-dien-3β,17β-diol, 4 parts of acetic anhydride, and 10 parts of pyridine is stored at room temperature for about 18 hours, then is cooled to about 0°. Dilution with water results in precipitation of the product, which is collected by filtration, washed on the filter with water, and dried. Recrystallization of this crude product from ether-hexane affords pure 3β-acetoxy-17α-ethynylandrosta-4,6-dien-17β-ol, M.P. about 129–131°; [α]_D=−162.5° (chloroform). It displays maxima in the infrared at about 2.73, 3.01, 3.37, 5.75, 6.05, 7.93, 9.55, 9.77, and 10.38 microns, and also ultraviolet maxima at about 231, 238, and 246 millimicrons with molecular extinction coefficients of about 24,800, 27,400, and 16,400, respectively. This compound is represented by the structural formula

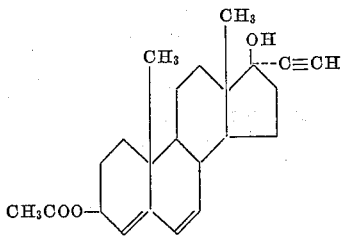

*Example 12*

A mixture of one part of 17α-ethynylandrosta-4,6-dien-3β,17β-diol, one part of propionic anhydride, and 3 parts of pyridine is allowed to stand at room temperature for about 5 hours, then is cooled to about 0° and diluted with water. The resulting aqueous mixture is extracted with ether, and the organic layer is separated, washed successively with dilute hydrochloric acid, water, and aqueous sodium bicarbonate, dried over anhydrous sodium sulfate, and evaporated to dryness. The residual material is crystallized from ether-hexane to produce pure 17α - ethynyl - 3β - propionoxyandrosta - 4,6 - dien - 17β-ol, M.P. about 117–118°; [α]_D=−163° (chloroform). Its infrared absorption spectrum displays maxima at about 2.81, 3.05, 3.42, 5.82, 6.11, 6.23, 8.45, 9.29, 9.45, and 9.92 microns, while its ultraviolet absorption spectrum is characterized by maxima at about 231, 238, and 246 millimicrons with molecular extinction coefficients of about 24,200, 26,800, and 17,000, respectively. This compound is represented by the structural formula

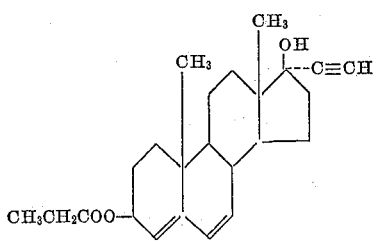

*Example 13*

By substituting 1.04 parts of 17α-propynylandrosta-4,6-dien-3β,17β-diol and otherwise proceeding according to the processes of Example 11, 3β-acetoxy-17α-propynyl-androsta-4,6-dien-17β-ol is obtained. This compound is represented by the structural formula

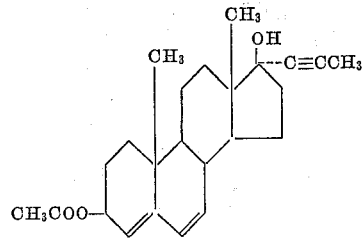

*Example 14*

The substitution of 1.14 parts of 17β-acetoxy-17α-ethynylandrosta-4,6-dien-3β-ol in the procedure of Example 11 results in 17α-ethynylandrosta-4,6-diene-3β,17β-diol 3,17-diacetate, M.P. about 165–166°. This compound is represented by the structural formula

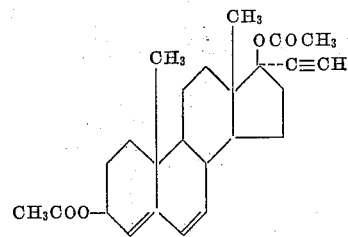

*Example 15*

The substitution of 1.17 parts of 17α-ethynyl-17β-propionoxyandrosta-4,6-dien-3β-ol in the procedure of Example 12 results in 17α-ethynylandrosta-4,6-diene-3β,17β-diol 3,17-dipropionate. This compound is represented by the structural formula

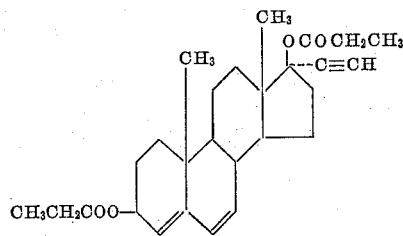

*Example 16*

By substituting 1.05 parts of 17β-acetoxy-17α-propynyl-androsta-4,6-dien-3β-ol in the process of Example 11, 17α-propynylandrosta-4,6-diene-3β,17β-diol 3,17-diacetate is obtained. This compound is represented by the structural formula

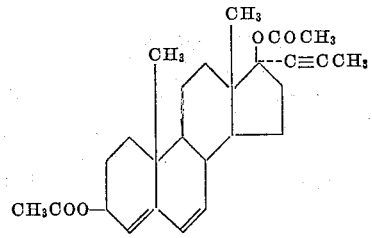

*Example 17*

To a solution of 4 parts of 17β-acetoxy-17α-ethynyl-estra-4,6-dien-3-one in 100 parts of tetrahydrofuran is added 10 parts of lithium tri-(tertiary-butoxy) aluminum hydride, and the resulting mixture is stirred at room temperature for about one hour, then is neutralized with dilute acetic acid. The resulting precipitate is collected by filtration, dried, and crystallized from acetone-hexane to produce 17β-acetoxy-17α-ethynylestra-4,6-dien-3β-ol, M.P. about 180–183°; [α]_D=−136° (chloroform). This substance exhibits infrared maxima at about 2.73, 3.01, 3.38, 5.71, 7.93, 9.67, 10.13, and 11.37 microns, and also ultraviolet absorption maxima at about 233, 239.5, and 248 millimicrons with molecular extinction coefficients of about 22,600, 24,500, and 15,700, respectively. This compound is represented by the structural formula

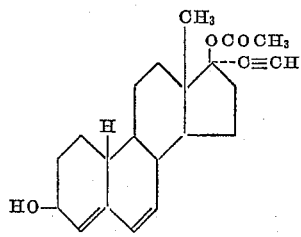

*Example 18*

By substituting 4.8 parts of 17α-butynyl-17β-propionoxyestra-4,6-dien-3-one and otherwise proceeding according to the processes of Example 17, 17α-butynyl-17β-propionoxyestra-4,6-dien-3β-ol is obtained. This compound is represented by the structural formula

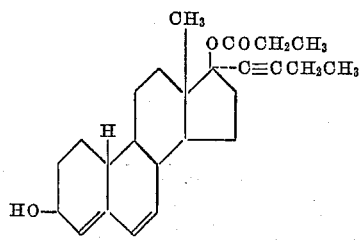

*Example 19*

The substitution of 1.09 parts of 17β-acetoxy-17α-ethynylestra-4,6-dien-3β-ol in the procedure of Example 11 results in 17α-ethynylestra-4,6-diene-3β,17β-diol 3,17-diacetate, which melts at about 188–190°; [α]$_D$=—165°. It exhibits infrared maxima at about 3.01, 3.37, 5.73, 6.05, 6.22, 9.70, 10.26, and 11.33 microns. This compound is represented by the structural formula

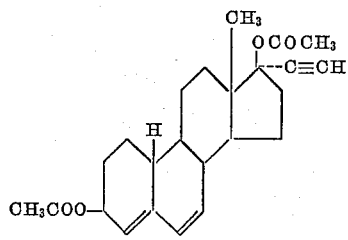

*Example 20*

The substitution of 1.09 parts of 17α-butynyl-17β-propionoxyestra-4,6-dien-3β-ol and 5.1 parts of propionic anhydride in the procedure of Example 11 results in 17α-butynylestra - 4,6 - diene - 3β,17β - diol 3,17-dipropionate. This compound is represented by the structural formula

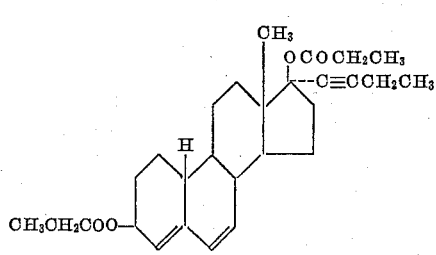

*Example 21*

The substitution of 2.86 parts of 17α-ethnyl-17β-hydroxyestra-4-en-3-one in the procedure of Example 1 results in 17α - ethynyl-17β-hydroxyestra-4,6-dien-3-one. This compound is represented by the structural formula

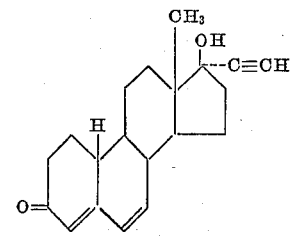

*Example 22*

The substitution of 0.95 part of 17α-ethynyl-17β-hydroxyestra-4,6-dien-3-one in the procedure of Example 6 results in 17α-ethynylestra-4,6-diene-3β,17β-diol. This compound is represented by the structural formula

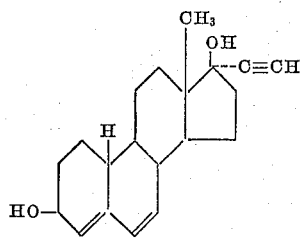

*Example 23*

By substituting 0.95 part of 17α-ethynylestra-4,6-diene-3β,17β-diol and otherwise proceeding according to the processes of Example 11, 3β-acetoxy-17α-ethynylestra-4,6-dien-17β-ol is obtained. This compound is represented by the structural formula

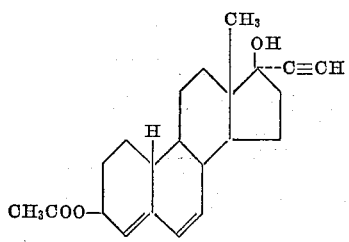

What is claimed is:
1. A compound of the structural formula

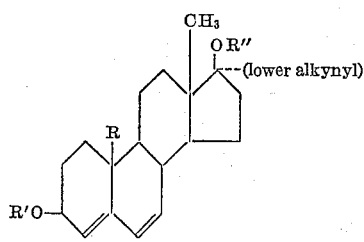

wherein R is selected from the group consisting of hydrogen and a methyl radical, and R' and R'' are selected from the group consisting of hydrogen and lower alkanoyl radicals.

2. A compound of the structural formula

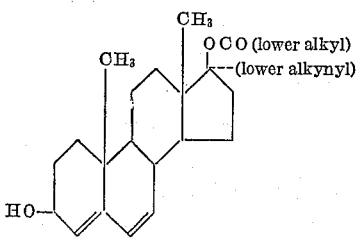

3. A compound of the structural formula

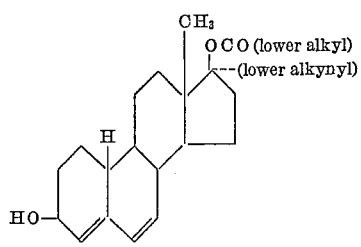

4. 17α-ethynylandrosta-4,6-diene-3β,17β-diol.
5. 17β-acetoxy-17α-ethnylandrosta-4,6-dien-3β-ol.
6. 3β-acetoxy-17α-ethynylandrosta-4,6-dien-17β-ol.
7. 17α-ethynyl-3β-propionoxyandrosta-4,6-dien-17β-ol.

8. 17α - ethynylandrosta - 4,6 - diene-3β,17β-diol-3,17-diacetate.
9. 17β-acetoxy-17α-ethynylestra-4,6-dien-3β-ol.
10. 17α - ethynylestra - 4,6 - diene - 3β,17β - diol-3,17-diacetate.

References Cited in the file of this patent
UNITED STATES PATENTS

| | | |
|---|---|---|
| 2,311,067 | Miesher et al. | Feb. 16, 1943 |
| 2,843,609 | Colton | July 15, 1958 |
| 2,882,282 | Agnello et al. | Apr. 14, 1959 |
| 2,946,809 | Colton | July 26, 1960 |

OTHER REFERENCES

Chemical and Engineering News, September 16, 1957, pages 66–67.